United States Patent [19]

Vogt

[11] Patent Number: 5,399,223
[45] Date of Patent: Mar. 21, 1995

[54] METHOD AND DEVICE FOR LAMINATING LAYERS OF IDENTIFICATION CARDS, OR THE LIKE

[75] Inventor: Werner Vogt, Remetschwil, Switzerland

[73] Assignee: Interlock AG, Schlieren, Switzerland

[21] Appl. No.: 992,940

[22] Filed: Dec. 18, 1992

[30] Foreign Application Priority Data

Dec. 19, 1991 [DE] Germany .................. 41 41 972.3
Dec. 15, 1992 [DE] Germany .................. 42 42 210.8

[51] Int. Cl.⁶ .......................................... B29C 65/00
[52] U.S. Cl. ................................ 156/285; 156/311; 156/498; 156/583.1
[58] Field of Search .............. 156/285, 286, 311, 312, 156/498, 583.1; 264/327; 100/38, 93 P; 425/407

[56] References Cited

U.S. PATENT DOCUMENTS

| | | | |
|---|---|---|---|
| 2,532,501 | 12/1950 | Johnson | 425/144 X |
| 2,874,751 | 2/1959 | Norton | 100/93 P |
| 3,681,167 | 8/1972 | Moore | 156/312 X |
| 3,769,132 | 10/1973 | Cram | 156/286 |
| 3,879,251 | 4/1975 | Ingham | 156/311 |
| 4,204,822 | 5/1980 | Hewitt | 425/210 |
| 4,290,838 | 9/1981 | Reavill et al. | 156/286 |
| 4,550,057 | 10/1985 | Kataoka | 428/215 |
| 4,752,204 | 6/1988 | Kataoka | 425/384 |

FOREIGN PATENT DOCUMENTS

| | | |
|---|---|---|
| 0013557 | 7/1980 | European Pat. Off. . |
| 0154970 | 9/1985 | European Pat. Off. . |
| 0499513 | 8/1992 | European Pat. Off. . |
| 1810986 | 6/1970 | Germany . |
| 3910021 | 10/1990 | Germany . |
| 57-135137 | 8/1982 | Japan . |
| 8701651 | 3/1987 | WIPO . |

*Primary Examiner*—David A. Simmons
*Assistant Examiner*—J. Sells
*Attorney, Agent, or Firm*—Darby & Darby

[57] ABSTRACT

For laminating layers consisting at least in part of thermoplastic films, in particular for producing identification cards, or the like, carrying information and/or data, a method is proposed where the blank, after having been introduced between pressing dies, is initially subjected to the pressure and heat required for complete lamination of the blank. Heat dissipation is prevented during heating by the fact that cooling components are kept at a predetermined distance from the heating surfaces. During a subsequent transition from heating to cooling, the heating effect is terminated and cooling bodies are brought into contact with the pressing and heating components, for reducing the temperature of the completely laminated product.

10 Claims, 5 Drawing Sheets

METHOD AND DEVICE FOR LAMINATING LAYERS OF IDENTIFICATION CARDS, OR THE LIKE

BACKGROUND OF THE INVENTION

The present invention relates to a method for laminating layers consisting at least in part of thermoplastic films.

In the case of known methods for laminating layers, and a corresponding double-plate pressing device for carrying out the method (European Patent Application No. 0013557), the layers are compressed to a composite material under the effect of heat and pressure. This is achieved by initially placing the blank, which is composed of the different layers, in the pressing device and applying two heatable plates on the two sides of the blank so as to exert heat and pressure upon both sides of the blank, and switching off the heating thereafter so that after cooling down the identification cards so produced can be removed from the pressing device.

In addition to disclosing the arrangement of resistance wires in the oversized pressing plates arranged on both sides, which interact directly with the layers to be laminated and which are screened from the supporting plates of the pressing device on which they are mounted by interposed insulating layers, this publication also discloses an arrangement where the pressing plates are configured as cooled supporting plates and are preceded by a flat heating resistance layer serving as a heating element, the heating resistance layer being arranged so as to directly face the layers to be laminated and being thermally screened against the cooled supporting plates by an insulating layer. The heating resistance layer is supplied with pulse-shaped voltages from a heater voltage source, it being an additional particularity of this known laminating device that certain, especially heat-sensitive security features, such as guilloche prints or watermarks, microfilm formers, holograms, or the like, can be provided in the check, identity or passport cards by means of dies arranged exclusively in the area of these additional pressure and temperature sensitive security features, which dies are set off to the rear and have a temperature lower than the temperature of the plates producing the heating effect. Consequently, the pressure in the area of the die openings is lower than the lamination pressure, and the temperature is also lower in these areas than the temperature of the plate.

The problem with all the laminating devices of the prior art lies in the fact that the production cycle consists of two clearly distinguishable subcycles, namely the initial application of heat, which should be as abrupt as possible to attain the laminating temperature of the layers of the identification card—only this term will be used hereafter to describe the object to be produced—that are to be fused, and a subsequent cooling cycle which is initiated by switching off the heating elements and during which the pressing device may not be opened to remove the laminated card blank because the latter still lacks the necessary mechanical stability.

It is, therefore, desirable to subject the blank, or initially the composite layers, in the pressing device at first to a heating step and then to a cooling phase, which means that the insulating layer arranged between the flat film heating layer and the pressing plate, which latter is actively cooled in most of the cases, has to fulfill two opposing functions both of which are performed by it unsatisfactorily: During the heating phase, it is to protect the adjacent cooling plates as perfectly as possible from the heat emitted or applied by the heating element, and to direct such heat to the layers to be laminated, while during the cooling phase, after the heating has been switched off, the heat flow, which previously was to be suppressed, is now to be enabled perfectly and comprehensively, and exactly in the direction toward the cooled supporting plates, i.e. that direction in which no heat flow was allowed during the preceding heating phase.

If, therefore, the "insulating layer" is designed to provide a highly heat-insulating effect, a good heating effect but unsatisfactory recooling is obtained, whereas the selection of a highly heat-conducting material for the "insulating layer" leads to satisfactory recooling, but impairs the initially required heat insulation.

The laminating device for producing identification cards known from European Patent Specification No. 0 154 970 also recognizes this problem mentioning that theretofore such laminating devices consisted of a heating element formed by glass fiber mats, arranged directly adjacent a metal block comprising heating fins, with resistance ladder paths arranged between the glass fiber mats. Thus, a considerable share of the heat initially produced flows into the metal block, thereby heating the latter, and cooling can be effected only after fusing of the card blanks, as otherwise the necessary fusing temperature will not be reached during the fusing process. Recooling of the heated mass of the metal block must take place only after completion of the fusing process. All this shows that with the cooling devices previously known the different phases of the beforementioned cycles do not function properly, and that one therefore tries to make the disadvantages, which are always encountered, controllable by the use of a specifically designed time control. Yet, it cannot be avoided that a comparatively long total cycle (heating up and subsequent recooling) has to be accepted. In practice, such a cycle always takes between half of a minute and several minutes, and the heat losses are still very considerable, although the cited Patent Specification 0154 970 speaks, however, of a few seconds only.

Another publication describing a further known device (U.S. Pat. No. 4,108,713), which is also suited for laminating identification cards, provides a more detailed description of the flat heating element normally used for the lamination process. The heating element consists in this case of a carrier plate of small mass and correspondingly low thermal capacity so that both the heating process and the subsequent recooling process can be effected very quickly; the metallic carrier plate has a thickness of less than 0.25 mm, and an electric insulating layer consisting of silicone rubber is arranged between the flat heating element proper and the carrier plate. The flat heating element comprises flat resistance wires arranged in a meandering pattern, and a heat sensor is provided adjacent the resistance wires for heat control purposes.

In a different context, i.e. in connection with the production of thin thermoplastic synthetic resin films, a process is known (U.S. Pat. No. 4,752,204) where a resin block blank consisting of the respective synthetic resin is heated between a pair of heated pressing plates, while its dimensions are considerably changed under the effect of pressure in order to deform it into a film.

For this purpose, a suitable pressing tool consists of two oppositely arranged pressing jaws with pressing plates provided therein on both sides which pressing plates are held, under the effect of springs, at a certain distance from adjoining cooling blocks and are intended for receiving the synthetic resin block between them.

As one realized that it is not possible to cool and heat simultaneously, one decided in the case the pressing surfaces, which are kept at a distance from the cooling blocks, to first introduce between the surfaces a heating element, from a different location, for heating up the pressing surfaces on both sides. As soon as the surfaces are heated up sufficiently—the heat being initially prevented from dissipating through the existing spacing to the adjoining cooling blocks—the heating element is withdrawn, and the synthetic resin block to be deformed is inserted. Thereafter, the pressing dies are moved toward each other, and the heated pressing surfaces are pressed simultaneously against the cooling plates and the inserted synthetic resin block, while the previously active biasing springs give way, so that during the deforming process—and this is the only decisive aspect—the heat introduced is simultaneously transmitted to the blank and dissipated via the cooling blocks. Such a process may be suited for the production of films from thermoplastic synthetic resins, but is of no use for the production of a laminated composite material for identification cards, or the like, because it does not in any way remedy the real problem, namely that the heat is simultaneously introduced and dissipated during the processing step, i.e. when heat and pressure are exerted on the blank.

Another known method, which similarly belongs to a different class and which is intended for producing sandwich panels, makes use of intermediate products consisting of high-performance composite materials with polymeric matrices (German Offenlegungsschrift 39 10 021). Such sandwich elements comprise an inner honeycomb material, consisting for example of aluminium, a plastic material or impregnated paper, with polymers applied thereon as top laminates. The precut intermediate product, consisting of polymeric top layers and the core material, is initially heated up between two plates by resistance heating in pressureless condition, the pressure initially applied upon the two heating plates on both sides, via pressure springs and insulators, being just sufficient to ensure satisfactory heat transfer from the heating plates to the intermediate product.

Only when the processing temperature has been reached will the outer cooled pressing plates move toward the heating plates on both sides, and the heated intermediate product between them, so that during this phase the core material is compressed and united with the heated-up top layers, while heat is simultaneously dissipated from the heating plates toward the cooled die plates. It has to be assumed in this case that in practice the cooling action necessarily must be initiated before applying the pressing force required for the deformation process, as the pressing force can be applied only after the cooled pressing plates are in full contact with the extremely thin heating plates. This means that in the case of this known method, too, at least cooling and deformation take place simultaneously.

Now, it is the object of the present invention to remedy this situation and to provide a method for producing identification cards, credit cards, and the like, which reconciles and complies with the fundamentally opposing requirements of ensuring at the same time efficient thermal insulation (during the heating process), followed by rapid and perfect, unobstructed cooling of the laminated product.

SUMMARY OF THE INVENTION

The invention clearly subdivides the laminating process physically into a heating phase and a subsequent cooling phase, without any overlapping in time and, as a result thereof, without any mixed behavior that would impair the quality of the product.

The invention, therefore, succeeds on the one hand in carrying out the entire laminating process quickly and, thus, in ensuring an especially high quality of the product, i.e. the identification card, credit card, identity card, or the like, composed of a plurality of laminate layers, and on the other hand in enhancing the thermoplastic behavior of the laminate layers by precise, highly efficient and chronologically distinguished processing steps (heating - cooling).

The heating efficiency is decisively improved due to the fact that practically no heating losses are encountered so that the plasticizing and fusing process starts by a steep temperature rise and terminates after a short dwelling time, while on the other hand the cooling effect is also decisively improved due to the fact that now dissipation of the heat present at the end of the heating subcycle can take place unobstructedly, as a result of a valve effect provided by the components involved in the laminating process, and that in addition a simultaneous controlled cooling action can be produced.

The invention provides the advantage that it is now possible, with only slightly greater mechanical input for at least one of the pressing dies, to attain an extraordinarily good insulating effect during the heating subcycle, which means rapid heating up and a short waiting time until the plasticizing temperature is reached, and subsequently also an especially good heat dissipation effect through direct physical, preferably metallic and highly heat-conducting contact between the direct pressing area for the laminate layers to be laminated, and the cooling bodies. This different treatment within the same pressing and plasticizing zone—different with respect to the heating and cooling subcycles performed in this zone—is rendered possible by the invention due to the fact that a certain relative movement between the components is allowed without the need to apply substantial changes to the pressure-producing mechanisms anyway provided in conventional laminating devices.

This leads to the situation that the pressing and plasticizing zone is differently positioned, depending on the processing cycle (heating - cooling), and this means with respect to the heating and cooling effects exerted on the pressing zone and on the laminate layers positioned therein that the heat applied is prevented, by a highly effective thermal insulation, from being dissipated during the heating subcycle, whereas on the other hand, during the cooling subcycle, heat is virtually extracted from the pressing zone.

According to advantageous embodiment a relative movement between pressing die components is performed only in one of the pressing dies, whereas the other pressing die serves heating functions only and is not subjected to heat dissipation or any cooling action during any of the subcycles, but is instead equipped with thermal insulators so that its heat dissipation varies only as a result of the fact that the heating is switched off during the cooling cycle.

According to another advantageous embodiment, the cooling effect, which is notably activated during the cooling subcycle, is further increased and improved by the combined action of an element which generates a controlled cooling effect, preferably a Peltier element of flat shape. Such an element enables the cooling effect to be enhanced in a particularly efficient way.

According to another advantageous variant of the invention, at least some of the relative movements between the components are effected pneumatically.

For example, the inner area of the die, i.e. the area extending between the two pressing plates and receiving the blank to be laminated, may advantageously be sealed off from the environment and subjected to the action of a vacuum. The correspondingly strong forces so produced are absolutely sufficient to exert the pressing force required for the laminating process during the heating phase. This application of a vacuum has the additional decisive advantage that flaws or other phenomena that may be detrimental to the appearance of the blank, such as entrapped air bubbles, or the like, are safely avoided and that a particularly perfect appearance, and excellent quality, can be achieved especially for high-finish laminates.

The further sequence of motions following the heating phase, during which cooling blocks are moved toward the heated sandwich structure (also on both sides) may also be controlled by the existing vacuum. This can be achieved by extending the vacuum effect also to the area of the cooling block (and providing a corresponding peripheral sealing effect) so that the cooling blocks are moved against the respective sandwich structure.

If desired, this action can be additionally supported by the application of compressed air.

BRIEF DESCRIPTION OF THE DRAWING

Certain embodiments of the invention will now be described in more detail by reference to the drawing in which.

DESCRIPTION OF THE PREFERRED EMBODIMENTS

It is the underlying idea of the invention to decisively improve and shorten the recooling phase, which is always critical in any laminating process, by creating conditions in the area of the pressing die which did not exist during the preceding heating phase. This has the effect that the thermal energy produced during the heating subcycle is practically restricted on all sides by thermal insulators and directed onto the laminate layers to be laminated, so that an especially high utilization factor is achieved, whereas during the subsequent cooling subcycle optimized heat dissipation is rendered possible by the fact that certain components of at least one of the pressing dies perform a sequence of mechanical movements so as to enable cooling surfaces to be moved directly into the area of the heated pressing zone, and especially a cooling body to be brought into contact with the rear surfaces of the die components facing the laminate layers to be laminated, by bridging a previously existing insulating intermediate space.

In FIGS. 1 to 5, the pressing die is indicated by 10, an upper die by 11a, and a lower die by 11b.

The structure of the upper die is comparatively simple in this case, it being understood, however, that the upper die may also have the same design as the one that will be described further below for the lower die 11b.

Figure 5:
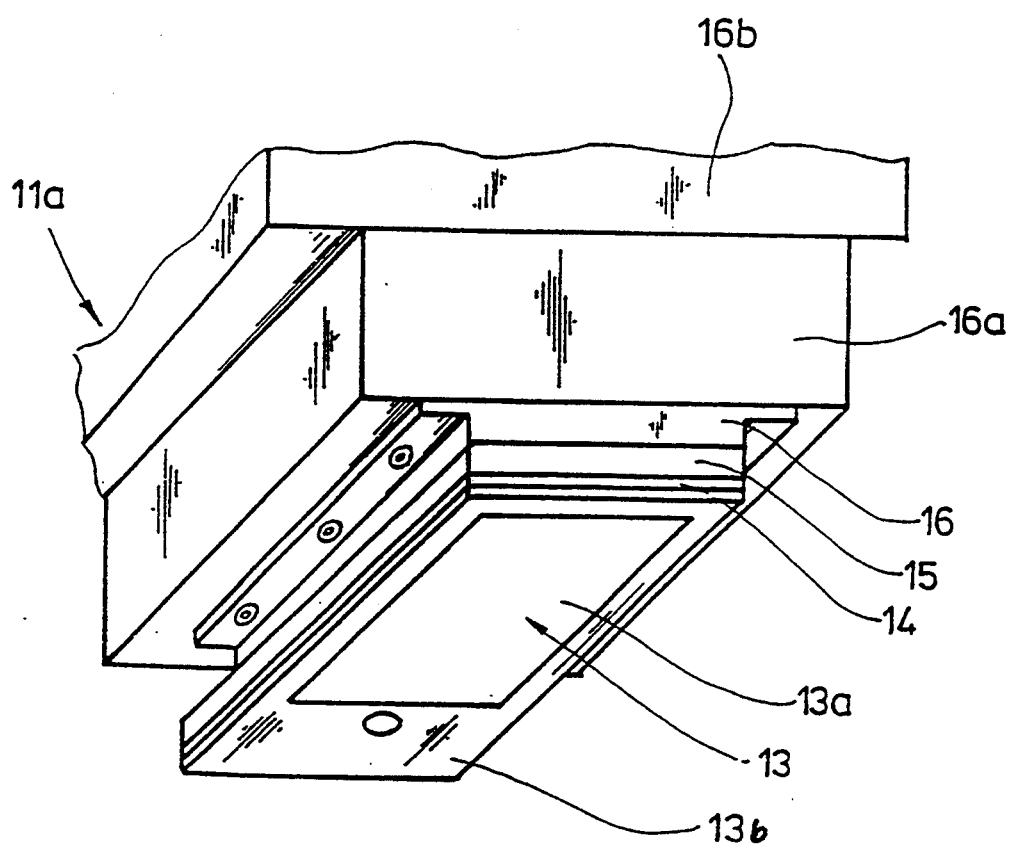
FIG. 5 shows a possible embodiment of an upper die, likewise in perspective representation.

In any case, the upper die of the illustrated embodiment—see also FIG. 5—comprises a, preferably metallic, pressing plate 13 provided directly adjacent the laminate package 12 to be laminated and consisting preferably of a suitable, very hard material, such as hard brass, which may also be tinned/nickel-plated. Arranged next to that pressing plate 13, which may have a thickness of, for example, 0.3 mm is a flat heating film 14—of the type normally used also in conventional devices—which may have a thickness of maximally 0.1 mm, for example, it being understood that this numerical value—just as any other numerical values stated herein—is not meant to restrict the invention, but only to illustrate it more clearly.

Finally, there may be arranged behind the heating film 14 a pressure-compensating layer 15 which may consist of any suitable material, preferably a plastic material, and here a polyacrylic layer having a thickness of 0.3 mm, for example.

This pressure-compensating layer may then be followed by several other layers, plates or blocks, which may be useful for incorporating the embodiment according to the invention into an existing laminating device where a predetermined spacing is provided in the die area. Such layers or blocks then serve as compensation layers for the existing spacing, provided however that the pressure-compensating layer 15 (for the laminating process) must be followed immediately by a heat insulating layer 16 which is to ensure that the heat generated by the flat heating film 14 cannot flow off unused in this direction. In any event, no cooling is provided for the area of the upper pressing die 11a so that the heat insulating layer 16 is followed—via another, preferably also heat-insulated intermediate block 16a—by an upper rocker construction 16b of the type normally provided in laminating devices. This completes the structure of the upper die.

It can be further seen in the representation of FIG. 5 that the pressing plate 13 facing the laminate layers to be laminated is designed in such a way that the hard brass plate 13a proper is surrounded by a carrier frame 13b, preferably an epoxy frame of equal thickness. The same applies to the heating film 14 which is held and surrounded by a corresponding carrier frame (not visible in FIG. 5).

Here, just as with respect to the structure of the other die, the individual layers preferably may be, and in fact are, bonded by double-sided adhesive films, which may be extremely thin, for example as thin as 0.002 mm.

The lower die 11b (see FIGS. 1-4) has a more complex design insofar as—in the case of the discussed embodiment of the invention—it includes the means permitting the relative movement between the different layered components, for producing the desired heating and/or cooling effects.

Firstly, the lower die 11b, i.e. the one which generally permits the relative movement of its components, also comprises a pressing plate 13' which also directly faces the product 12 to be laminated and which likewise consists of a suitable material, for example tinned/nickel-plated hard brass, and is surrounded by an (epoxy) frame 13'a.

Figure 2:
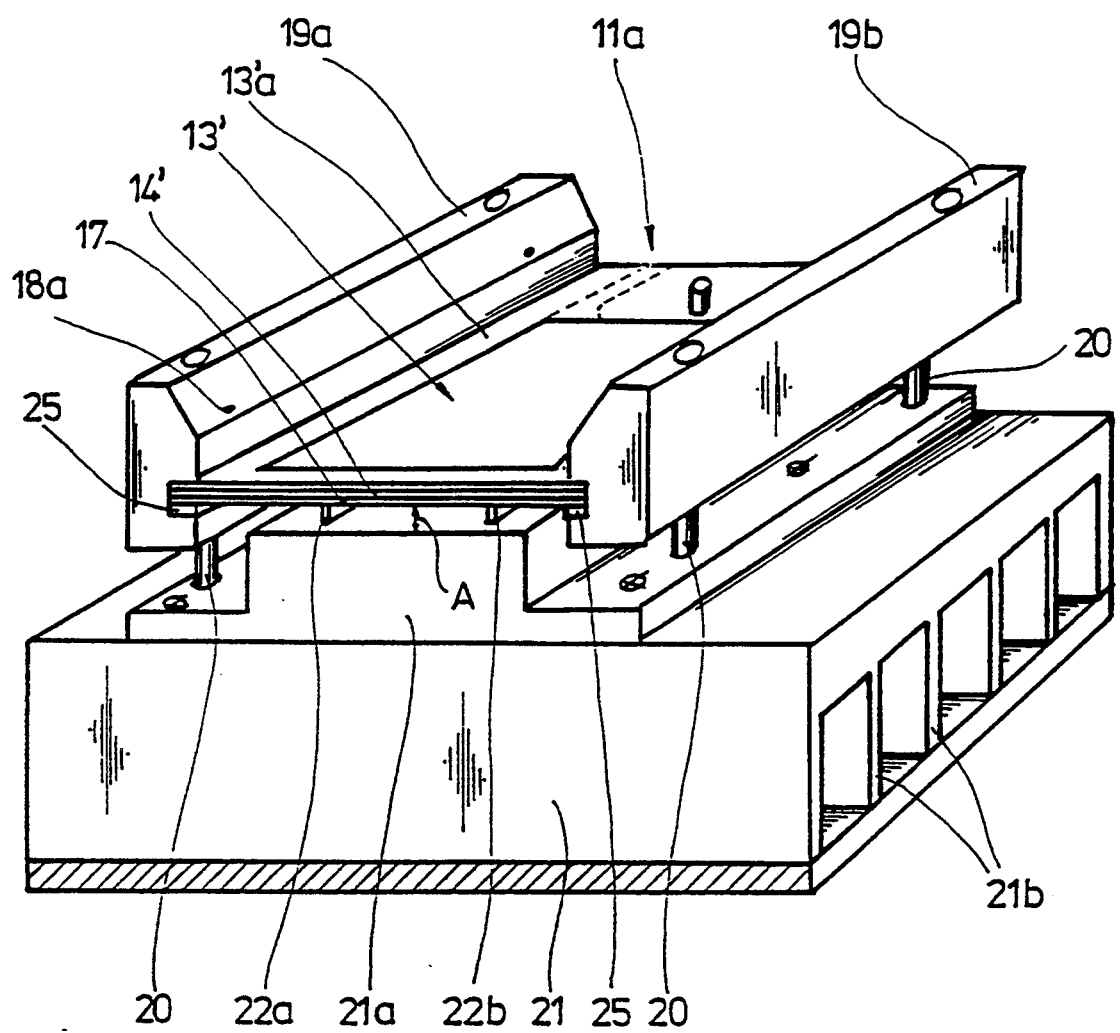
FIG. 2 shows, for the sake of improved understanding, a perspective view of a preferred structure of a die, for example the lower die.
Figure 3:
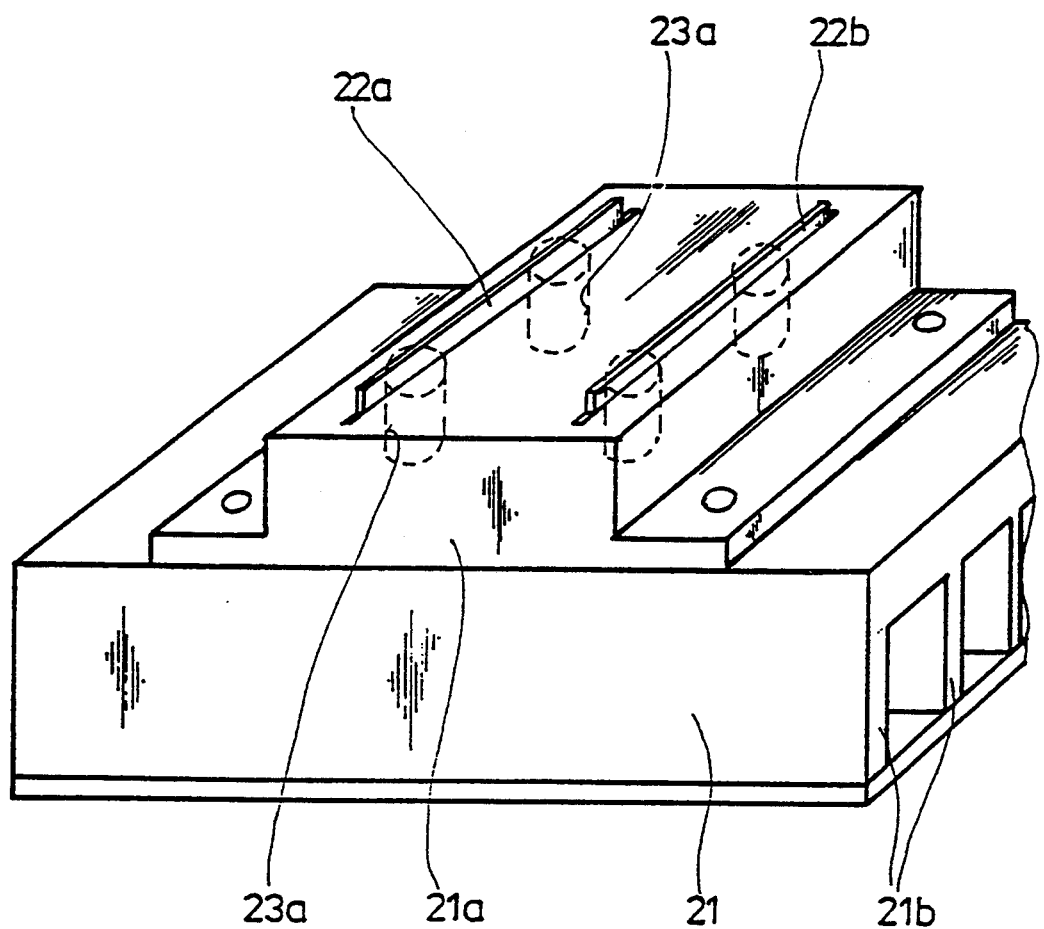
FIG. 3 shows another perspective view representing a detail of the lower die which illustrates particularly clearly the design of the cooling body with spring-loaded supporting webs.

At the bottom, i.e. on the side of the pressing plate opposite the laminate layers 12 to be laminated, the arrangement is—or may be—followed again by a flat heating film 14'; and there is further provided—essentially for stability reasons—another supporting layer or supporting plate 17 which may consist of a highly heat-conducting material, for example again brass (compare FIG. 2).

The thickness of the pressing plate may be 0.3 mm, that of the flat heating film 0.1 mm, and that of the supporting plate 17 may be 0.3 to 0.5 mm.

The different layers may be pinned together by lateral pins, for example nylon pins 18a, 18b, and may be held in lateral guide blocks 19a, 19b which latter may be loosely connected to a lower cooling block 21, which as such is known in connection with such laminating devices and which also may comprise cooling fins, as indicated by 21b, as part of the fan cooling system preferably used in this case.

It is an essential feature that in the initial or rest position a spacing A exists between the pressing plate 13' or—in the illustrated embodiment of the invention—between the lower supporting plate 17 provided for stability purposes, and the active area of the cooling block, the active area of the cooling block extending right to the supporting plate 17 because a cooling body 21a extends into the space defined by the lateral U-shaped guide blocks 19a, 19b. In the case of the assumed and presently discussed case, this cooling body may be constituted by an integrally formed projection of the cooling block 21. Alternatively, it may be configured as a separate cooling plate which is in highly heat-conducting contact with the cooling block 21, for example screwed to it in flat contact, as shown in FIG. 2.

It is the basic function of such a die that during the heating subcycle the cooling body 21a, whose cooling effect is decisively supported by the adjoining cooling block 21—another configuration of imaginable cooling means will be described further below—is kept at a distance from the pressing zone, whereas in the subsequent cooling subcycle this distance is bridged by an upward—as viewed in the drawing—movement of the cooling body 21a (and preferably also the cooling block 21) by which it is moved into contact with the highly heat-conducting brass supporting plate 17. As of the moment the heating effect of the flat heating elements 14, 14' has been switched off, the quantity of heat present in the laminating area is dissipated practically at once, it being without importance in this connection that the upper die 11a does not in any way contribute to this effect, at least in the illustrated embodiment.

The described relative movement is rendered possible by the fact that the assembly which consists of the pressing plate 13', the flat heating film 14' and the supporting plate 17 and is to have the least possible heat capacity and a thickness of only 1 mm, for example, is held and supported at its bottom by (heat-insulating) supporting webs 22a, 22b which in their turn are resiliently biased in upward direction and slidingly guided in corresponding bores 23—which may be equipped with guide bushings 23a—in the cooling body 21a. In order to achieve this effect, strong supporting springs 24 may be accommodated in larger recesses 23' in the cooling body for urging the supporting webs 22a, 22b in upward direction. In downward direction, the cooling body 21a rests on the cooling block 21 (see FIG. 3).

The basic function of this die 11b, therefore, is such that once the laminate layers 12 to be laminated have been inserted and the receiving opening has been closed, an initial pressing force is produced by moving the cooling block 21 in upward direction whereby the two pressing plates 13, 13' are advanced toward each other and are pressed upon the laminate layers 12 at the required pressing force. Then, the heating phase is initiated by supplying current to the flat heating films 14, 14'.

In the case of the practical embodiment of the invention, this upward movement of the cooling block 21 is performed in such a way that the cooling block 21 is displaced from the unstressed position, where the distance A may be equal to, say, 6 mm, to a first pressure threshold value where the springs 24 are compressed far enough to reduce the distance for example to half its value, i.e. approximately 3 mm, which has the effect that on the one hand a sufficient laminating pressure is exerted via the springs 24, while on the other hand the distance required for the initial heat insulation of the area of the pressing zone, being now A'=approximately 3 mm, is maintained.

Upon completion of the heating subcycle, the heating zones are switched off and a second (higher) threshold pressure is exerted upon the cooling body 21a, via the cooling block 21, for completely overcoming the biasing force of the springs 24. This has the result that the supporting webs 22a, 22b are pushed back far enough to permit the surface 21'a of the cooling body 21a to get into direct contact with the lower surface 17a of the supporting plate. One thereby attains extraordinarily effective cooling, the cooling body 21a getting into direct thermal interaction with the cooling block which, in addition to providing itself a correspondingly high refrigerating capacity, may preferably be additionally cooled by the air flow of a cooling fan.

It goes without saying, and is of course of practical use, too, that the cooling system of the cooling block and/or the associated cooling body 21a need not be tuned to the heating and cooling subcycles performed at any time, or to the entire laminating process; if the cooling block 21 is constantly cooled by blown-in surrounding air, a perfect thermal balance is ensured for the device, the heating and cooling phases proper being tuned to the relative movement of the die components.

In the case of the discussed laminating device, the relative movement is related to pressure values because it is anyway necessary to exert a predetermined pressure on the layers to be laminated so that different distances can be adjusted without any problem, giving regard to the pressure threshold values resulting from the spring characteristics of the particular spring used.

It is of advantage if the assembly comprising the pressing plate 13', the flat heating film 14' and the brass supporting plate 17, is thermally insulated from its surroundings. To this end, thermal insulators 25, preferably epoxy layers or strips, are provided on the lower contact surfaces of the brass supporting block 17, in the U-shaped recesses of the lateral guide blocks 19a, 19b in addition to the nylon pins by means of which the assembly is pinned in place.

According to another preferred embodiment of the present invention, the cooling effect of the cooling block 21 and the cooling body 21a in the area of the pressing zone is reinforced efficiently by the fact that Peltier elements or other components having a cooling effect on the cooling body 21a, are arranged in any position, preferably in the area between the cooling block 21 and the cooling body 21a. In the case of the illustrated embodiment of the invention, a Peltier element 26 is used whose cold side K faces the cooling body 21a, while its hot side W may, for example, be embedded in the cooling block 21 for more efficient heat dissipation. It is easily possible in this way to give the cooling body 21a a constant temperature; in addition, other arrangements may be made in this connection according to which current will be supplied to the Peltier element or elements 26 only when the temperature of the cooling body 21a differs from a predetermined target temperature, for example of 35°.

Figure 4:
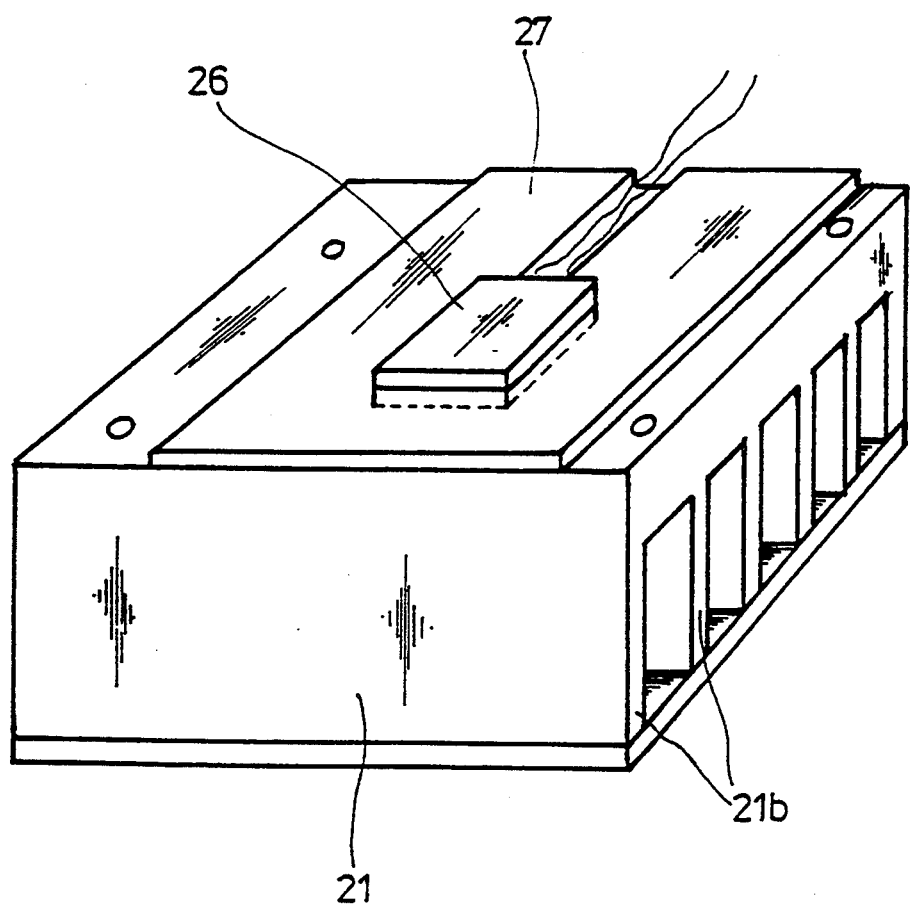
FIG. 4 shows a variant of the design of the cooling body, preferably for the lower die, with an additional cooling element.

If the Peltier element 26 does not extend over the whole contact surface between the cooling block 21 and the cooling body 21a, then it may be useful to arrange thermal insulators 27 between the remaining surfaces, in the drawing on both sides or on all sides of the Peltier element 26, which insulators in their turn may consist of epoxy layers or, as shown in FIG. 4, of an epoxy frame. Such an arrangement then avoids short-circuiting of the Peltier element.

In an effort to optimize both the heating capacity and the recooling process, the supporting webs 22a, 22b, as well as the intermediate layers 25 and 27, are configured as thermal insulators, as has been indicated before. With respect to the supporting webs 22a, 22b, this is meaningful insofar as this will prevent the heat produced from being dissipated, at least in part, via the webs during the heating subcycle.

Loose guiding of the guide blocks 19a, 19b on both sides in the cooling block 21 by means of the screw connections 20 is important in order to allow the cooling block 21 to move relative to the assembly comprising the pressing plate 13' and the supporting plate 17, which is pinned to the guide blocks.

Finally, an especially advantageous embodiment of the invention is obtained when the motion sequence, during which the inserted blank is laminated in the heating and cooling phase, i.e. during which pressing forces are applied via the two pressing plates and thereafter the cooling effect is activated in the cooling phase by the cooling block, is controlled at least in part without any mechanical forces, i.e. preferably pneumatically, by application of a vacuum and/or compressed air.

Figure 1:
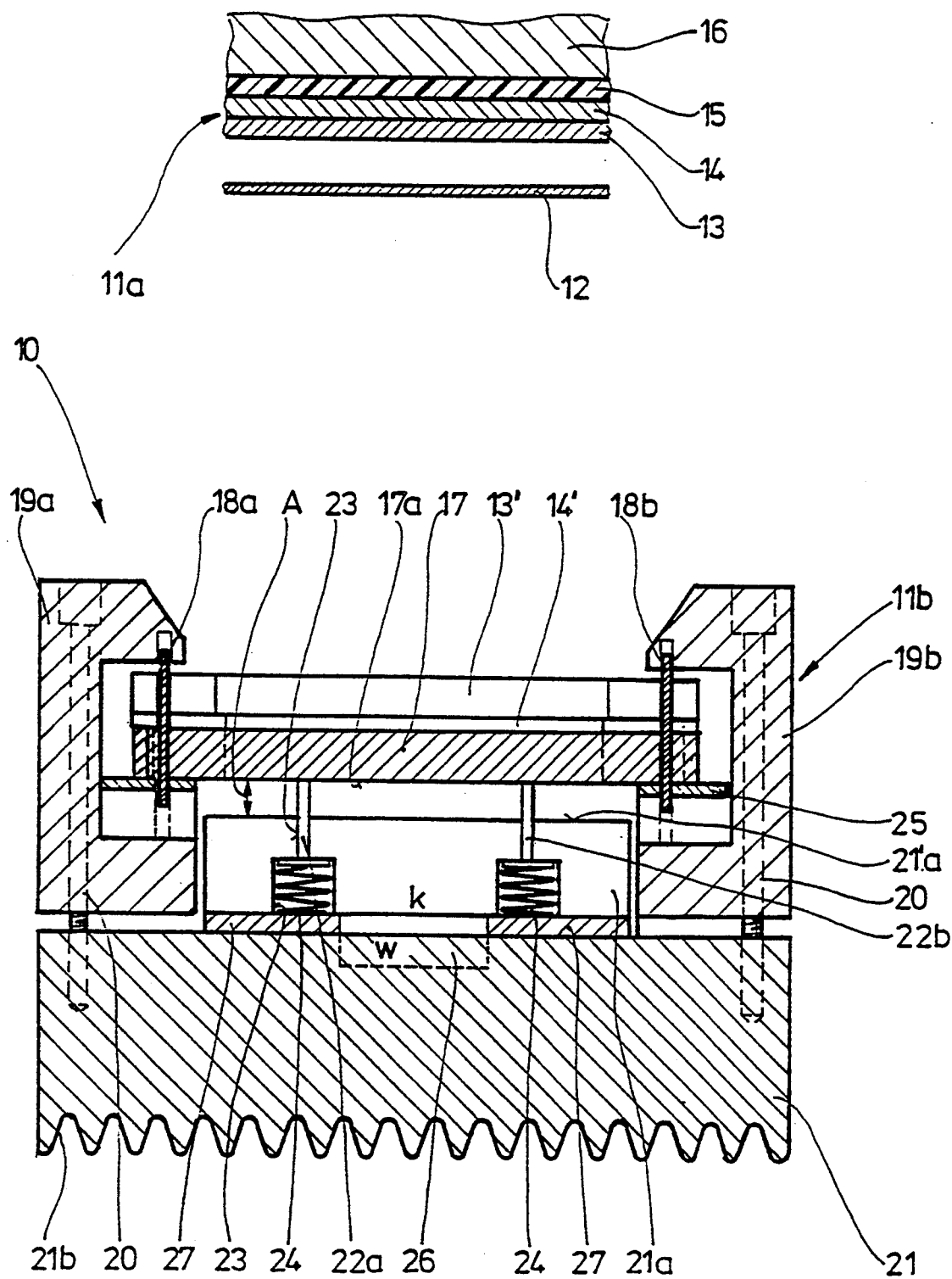
FIG. 1 shows a diagrammatic cross-section through a possible embodiment of the upper and the lower dies of a pressing tool used for laminating purposes.

Referring once more to the representation of FIG. 1, it is in any event possible in this case to do without the supporting webs 22a, 22b, and their supporting springs 24. Instead, a vacuum is applied at least to the space defined by the two pressing plates 13 (upper die—FIG. 5) and 13' (lower die—FIG. 1), after insertion of the blank and appropriate sealing, with the result that the two pressing plates—and the other layers combined therewith, i.e. the heating film, pressure-compensation layers, supporting plates, and the like, in which the dies are guided—will be pressed together at a sufficiently high pressure, due to the vacuum introduced between these two components of the assembly, so that the heating subcycle, and molding of the blank, can be carried out under the effect of the required temperature.

Working with pneumatically controlled motions provides the additional, particular advantage that the vacuum between the two areas of the assembly—of which one at least should be guided for displacement in the die so as to permit the required movement under the effect of the vacuum—will of course also influence the inserted blank, with the result that the latter is given an especially perfect, excellent appearance. This is due to the fact that, for example, any disturbing phenomena produced by air, such as bubbles, bulges, or the like, which otherwise cannot be excluded in such laminating processes, are absolutely excluded, the vacuum having of course the simultaneous effect that any air bubble, or trapped air, will be positively extracted, i.e. removed. This is a particular advantage for high-finish laminations.

The laminating process, thus, operates as follows: Once the blank has been inserted between the two dies of the pressing tool, and the dies have been closed, a vacuum is applied to the inner area of the dies so that due to the surrounding air pressure, which continues to act on the pressing plate assemblies, the necessary pressing force is made available for lamination, simultaneously with the required heat.

Upon completion of the heating subcycle, the heat is carried off rapidly, as has been described before, due to the fact that cooling surfaces are applied to the respective assembly comprising the pressing plate, heating film, supporting plate and the like. Preferably, this action occurs only in the lower die, but if desired it may be arranged for in the upper die, too.

The sequence of motions just described may also be pneumatically controlled, for example by the action of the vacuum anyway present. To this end, suitable valves that are activated at the moment of transition from the heating subcycle to the cooling subcycle are used to open the vacuum area to the top or to the bottom beyond the respective pressing plate assembly so that a suction force is applied to the cooling body, too; the simple establishment of contact already ensures a sufficient degree of heat transfer, without the need to exert additional higher pressing forces.

Alternatively, however, there is also the possibility to exert an (additional) external pneumatic overpressure on at least the lower cooling area in the pressing tool—or on both cooling areas, if provided, in which case the pressure so generated may be higher than the external atmospheric pressure maximally achievable under the effect of the applied vacuum.

There is, however, also the possibility to make use of rocking levers, magnetic effects, or spring forces or of a combination of such forces, for applying the cooling blocks and/or the cooling body plates to the respective pressing plate assembly at the moment of transition to the cooling subcycle.

Except for the necessary sealing means which can, however, be safely controlled if a sufficiently high vacuum is generated, choosing a pneumatic control for the pressing plate and the cooling body components also leads to a significant simplification of the structure of such a laminating device, as in this case a plurality of pressure webs, biasing springs, and the like can be omitted.

An alternative configuration of the mechanical structure, with spring-biased pressing assembly according to FIGS. 1 and 2, may finally provide that the pressure webs 22a, 22b are omitted, and the biasing spring means are located closer to the outside, i.e. to the marginal area. Advantageously, one may make use in this case of the fastening means (for example screws) 20, by providing them, for example, in the bores of the guide blocks, in coaxial arrangement with biasing springs in a manner such that the pressing assembly 13', 14', 17 is urged in upward direction. This is of advantage also because the sensitive laminating area is kept free in this case of any mechanical pressure means.

Lastly, it should be mentioned that the claims, and especially the main claim, are attempts at putting the invention into words without limiting prejudice. The right to regard all features presented in the description, the claims, and the drawings, both individually and in any combination, as essential to the invention, and to record them in the claims, is therefore reserved.

I claim:

1. Method for laminating layers consisting at least in part of thermoplastic films, for producing identification cards, check cards, identity cards, credit cards, or the like, carrying data, where an inserted blank is subjected to the action of pressure and heat by a pressing tool die arranged on at least one side and comprising heating and cooling means, wherein after insertion of the blank between the dies, the blank undergoes a heating phase in which the blank is subjected to the pressure and heat required for complete lamination of the blank, while heat dissipation is prevented by the fact that cooling components are kept at a predetermined distance from the pressing and heating components of the die or dies involved in the laminating step, whereafter the heating effect is switched off and the blank undergoes a cooling phase in which a cooling body is brought into contact with the assembly of pressing and heating components of a die involved in the laminating step whereby the temperature of the laminated product, which has been finished during the heating phase, is reduced to its proper removal temperature.

2. Method according to claim 1, wherein during the heating phase the cooling body is moved from an unstressed initial position, under the effect of pressure, into a position (A') at a smaller distance from the assembly of pressing and heating components, and is then, during the cooling phase, urged upward and into contact with the assembly until the spacing equals zero.

3. Method according to claim 1, wherein the assembly, which comprises a pressing plate (13') adjoining the layers (12) to be laminated, a flat heating film (14') adjoining the pressing plate and an additional lower, highly heat-conducting supporting plate (17), is maintained by spring action at an insulating spacing from the cooling body, whereby the necessary pressing force for the laminating process is simultaneously produced, and wherein the said spring pressure between the assembly and the cooling body (21a) is then fully overcome during the subsequent cooling phase and heat-conducting contact is established.

4. Method according to claim 3, wherein during the heating phase the assembly comprising the pressing plate (13'), the flat heating film (14') and the supporting plate (17) is kept in spaced relationship to its surroundings, including its supporting elements, by heat insulators and is brought into full-surface contact with the cooling body (21a) by a relative movement during the subsequent cooling subcycle.

5. Method according to claim 1, wherein a vacuum is applied to the space between the two pressing dies, in which the blank is accommodated, so that during the heating phase the pressing and heating components involved in the laminating step are pressed against the blank in order to exert a pressing and heating effect.

6. Method according to claim 5, wherein while maintaining the vacuum, the effect of the vacuum is extended also to the cooling body so that the body is urged into heat-conducting contact with the assembly of pressing and heating components.

7. Method according to claim 5, wherein compressed air is applied externally upon the cooling body, which initially had been maintained in spaced relationship to the assembly of pressing and heating components, whereby the cooling body is moved into contact with the pressing and heating components.

8. Method for laminating layers consisting at least in part of thermoplastic films, for producing identification cards, check cards, identity cards, credit cards, or the like, carrying data, where an inserted blank is subjected to the action of pressure and heat by a pressing tool die arranged on at least one side and comprising heating and cooling means, wherein after insertion of the blank between the dies, the blank undergoes a heating phase in which the blank is subjected to the pressure and heat required for complete lamination of the blank, a vacuum being produced in the space between the dies while the space is sealed from the outer atmosphere so that the assembly of pressing and heating components of a die involved in the laminating step are pressed against the blank by external air pressure in order to apply pressure and heat to the blank.

9. Method according to claim 8, wherein the heating effect is switched off and the blank undergoes a cooling phase in which a cooling body is brought into contact with the assembly of pressing and heating components, the cooling body being maintained at a predetermined distance from the assembly during the heating phase to prevent heat dissipation, and the cooling body being moved into contact with the assembly by applying a vacuum to the cooling body.

10. Method for laminating layers consisting at least in part of thermoplastic films, for producing identification cards, check cards, identity cards, credit cards, or the like, carrying data, where an inserted blank is subjected to the action of pressure and heat by a pressing tool die arranged on at least one side and comprising heating and cooling means, wherein after insertion of the blank between the dies, the assembly of pressing and heating components of a die is urged towards the blank so that the blank undergoes a heating phase in which the blank is subjected to the pressure and heat required for complete lamination of the blank, the heating effect being switched off and the blank thereafter undergoing a cooling phase in which a cooling body is urged towards the blank and into contact with the assembly of pressing and heating components, at least one of the assembly and the cooling body being urged towards the blank by directly applying positive air pressure, or positive air pressure and vacuum, thereto.

* * * * *